(12) United States Patent
Makino et al.

(10) Patent No.: US 8,393,424 B2
(45) Date of Patent: Mar. 12, 2013

(54) IN-WHEEL MOTOR DRIVE UNIT

(75) Inventors: Tomoaki Makino, Iwata (JP); Ken Yamamoto, Iwata (JP); Minoru Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 478 days.

(21) Appl. No.: 12/674,488

(22) PCT Filed: Jul. 24, 2008

(86) PCT No.: PCT/JP2008/063253
§ 371 (c)(1),
(2), (4) Date: Feb. 22, 2010

(87) PCT Pub. No.: WO2009/028278
PCT Pub. Date: Mar. 5, 2009

(65) Prior Publication Data
US 2011/0133541 A1 Jun. 9, 2011

(30) Foreign Application Priority Data
Aug. 24, 2007 (JP) .................. 2007-218840

(51) Int. Cl.
*B60K 1/00* (2006.01)
(52) U.S. Cl. .............. 180/65.51; 180/65.6; 301/6.5; 475/162
(58) Field of Classification Search ........... 180/65.51, 180/65.6, 65.7; 475/5, 162, 176, 177, 179, 475/331, 335; 301/6.5; 903/909, 910, 911
See application file for complete search history.

(56) References Cited

U.S. PATENT DOCUMENTS

| | | | | |
|---|---|---|---|---|
| 1,421,375 A | * | 7/1922 | Baines | 475/175 |
| 1,449,351 A | * | 3/1923 | Seeck | 74/498 |
| 1,773,568 A | * | 8/1930 | Braren | 475/159 |
| RE17,811 E | * | 9/1930 | Braren | 475/168 |

(Continued)

FOREIGN PATENT DOCUMENTS

| DE | 459 025 | 4/1928 |
|---|---|---|
| DE | 612 777 | 5/1935 |

(Continued)

OTHER PUBLICATIONS

Translation in-part from DE 459025: p. 1, lines 32-34, and p. 1, lines 46-51.*

*Primary Examiner* — Katy M Ebner
*Assistant Examiner* — Emma K Frick
(74) *Attorney, Agent, or Firm* — Clark & Brody

(57) ABSTRACT

An in-wheel motor drive unit (21) includes a motor portion A, a speed reduction portion B, and a wheel hub C. The speed reduction portion B includes outer pins (27) engaging with circumferences of curve plates (26a) and (26b) to generate rotation movements of the curved plates, and an outer pin holding portion (45) fixedly fitted in an inner diameter surface of a casing (22) holding the speed reduction portion B, to hold the outer pins (27) parallel to a rotation axis of a motor side rotation member (25). The outer pin holding portion (45) includes a cylindrical portion (46), a pair of ring portions (47) and (48) extending from axial both ends of the cylindrical portion (46) to radially inner side, and a pair of outer pin holding holes (47a) and (48a) provided at opposed positions of the pair of ring portions (47) and (48), and extending parallel to the rotation axis of the motor side rotation member (25) to hold the axial ends of the outer pin (27).

5 Claims, 7 Drawing Sheets

| U.S. PATENT DOCUMENTS | | | |
|---|---|---|---|
| 2,239,839 A | | 4/1941 | Benson |
| 3,073,184 A | * | 1/1963 | Brarern .................. 475/180 |
| 4,050,331 A | * | 9/1977 | Braren .................. 475/168 |
| 4,297,920 A | * | 11/1981 | Richter .................. 475/168 |
| 4,307,630 A | * | 12/1981 | Osborn et al. ............ 475/159 |
| 5,616,095 A | * | 4/1997 | Pruitt .................. 475/178 |
| 5,707,310 A | * | 1/1998 | Maeguchi et al. .......... 475/180 |
| 6,632,152 B1 | * | 10/2003 | Tiufektchian .............. 475/176 |
| 7,351,177 B2 | * | 4/2008 | Christ .................. 475/168 |
| 7,530,416 B2 | * | 5/2009 | Suzuki .................. 180/65.51 |
| 8,033,943 B2 | * | 10/2011 | Suzuki .................. 475/179 |

| FOREIGN PATENT DOCUMENTS | | |
|---|---|---|
| DE | 12 86 273 | 1/1969 |
| JP | 33-004424 | 3/1958 |
| JP | 50-019095 | 6/1975 |
| JP | 4-282047 | 10/1992 |
| JP | 2002-39287 | 2/2002 |
| JP | 2006-258289 | 9/2006 |
| JP | 2007-78177 | 3/2007 |
| JP | 2007-131295 | 5/2007 |
| WO | 2009/113456 | 9/2009 |

* cited by examiner

IN-WHEEL MOTOR DRIVE UNIT

TECHNICAL FIELD

The present invention relates to an in-wheel motor drive unit in which an output shaft of an electric motor is connected to a hub of a wheel through a reducer.

BACKGROUND ART

A conventional in-wheel motor drive unit 101 is disclosed in Japanese Unexamined Patent Publication No. 2006-258289, for example. Referring to FIG. 8, the in-wheel motor drive unit 101 includes a motor portion 103 to generate driving force in a casing 102 mounted on a vehicle body, a wheel hub bearing portion 104 directly connected to a wheel, and a speed reduction portion 105 to reduce rotation speed of the motor portion 103 and transmit it to the wheel hub bearing portion 104.

The above in-wheel motor drive unit 101 employs a low-torque high-rotation motor in the motor portion 103 to implement a compact unit. Meanwhile, high torque is required in the wheel hub bearing portion 104 to drive the wheel. Thus, the speed reduction portion 105 sometimes employs a cycloidal reducer which is compact and high in reduction ratio.

In addition, the speed reduction portion 105 using a conventional cycloidal reducer includes a motor side rotation member 106 having eccentric portions 106a and 106b, curve plates 107a and 107b arranged at the eccentric portions 106a and 106b, rolling bearings 111 rotatably supporting the curve plates 107a and 107b with respect to the motor side rotation member 106, a plurality of outer pins 108 engaging with circumference surfaces of the curve plates 107a and 107b to generate rotation movements of the curve plates 107a and 107b, and a plurality of inner pins 109 to transmit the rotation movements of the curve plates 107a and 107b to a wheel side rotation member 110.

In order to incorporate the outer pins 108 into the casing 102 in the above speed reduction portion 105, it is necessary to axially split the casing 102 into two parts at the position of the outer pin 108 and form a recession portion to hold the outer pin 108 in each of the two split casing.

At this time, unless the positions of the corresponding recession portions strictly coincide with each other, the outer pin 108 is inclined with respect to the motor side rotation member 106. When the outer pin 108 is incorporated in the inclined condition, an edge load is generated between the curve plates 107a and 107b, and the outer pin 108 and the durability of the speed reduction portion 105 is lowered.

DISCLOSURE OF THE INVENTION

Thus, it is an object of the present invention to provide an in-wheel motor drive unit superior in durability and high in reliability by improving parallelism between a motor side rotation member and an outer pin.

An in-wheel motor drive unit according to the present invention includes a motor portion to rotate and drive a motor side rotation member having an eccentric portion, a speed reduction portion to reduce rotation speed of the motor side rotation member and transmit it to a wheel side rotation member, a casing to hold the motor portion and the speed reduction portion, and a wheel hub fixedly connected to the wheel side rotation member. The speed reduction portion includes a revolution member having a through hole for the insertion of the eccentric portion to make a revolution movement around a rotation axis of the motor side rotation member in conjunction with a rotation thereof, a circumference engagement member to engage with a circumference of the revolution member to generate a rotation movement of the revolution member, a circumference engagement member holding portion fixedly fitted in an inner diameter surface of the casing holding the speed reduction portion, to hold the circumference engagement member parallel to the rotation axis of the motor side rotation member, and a motion conversion mechanism to convert the rotation movement of the revolution member to the rotation movement moving around the rotation axis of the motor side rotation member and transmit it to the wheel side rotation member. The circumference engagement member holding portion includes a cylindrical portion, a pair of ring portions extending from axial both ends of the cylindrical portion to the radial inner side, and a pair of circumference engagement member holding holes provided at opposed positions of the pair of ring portions, and extending parallel to the rotation axis of the motor side rotation member to hold axial ends of the circumference engagement member.

When the above configuration is implemented, an edge load can be prevented from being generated between the revolution member and the circumference engagement member, and the in-wheel motor drive unit is superior in durability and high in reliability. In addition, since the circumference engagement member holding holes can be formed in the pair of ring portions in a simultaneous process, the parallelism with the motor side rotation member can be easily enhanced as compared with the case where they are formed in the split casings, respectively.

Preferably, the cylindrical portion has a revolution member insertion hole penetrating in a radial direction such that the revolution member can be inserted in the radial direction. Thus, the revolution member can be incorporated from the radial direction of the circumference engagement member holding portion.

Preferably, the pair of ring portions has a recession portion to reduce its thickness. Thus, the in-wheel motor drive unit can be light in weight.

Preferably, a rotation stopper portion is provided at the positions of an inner diameter surface of the casing and an outer diameter surface of the circumference engagement member holding portion to prevent the circumference engagement member holding portion from relatively rotating with respect to the casing. Thus, the reliability of the in-wheel motor drive unit can be further improved.

Preferably, an elastic member to allow displacement of the circumference engagement member holding portion in the radial direction is arranged between the circumference engagement member holding portion and the casing. Thus, even when a large radial load and moment load are applied due to the turn and abrupt acceleration and reduction in speed, the components such as the revolution member, the circumference engagement member, and the movement conversion mechanism can be prevented from being damaged. In addition, sound is prevented from generating between the casing and the circumference engagement member holding portion due to the vibration at the time of traveling a rough road.

Preferably, the casing is made of light metal. Meanwhile, the circumference engagement member holding portion is made of carbon steel. The in-wheel motor drive unit is desirably made of light metal in view of weight reduction. Thus, when only the circumference engagement member holding portion which is required to be high in strength especially is made of carbon steel, the in-wheel motor drive unit can be light in weight without damaging its reliability.

According to the present invention, since the parallelism between the motor side rotation member and the circumference engagement member is improved, the in-wheel motor drive unit can be high in durability and high in reliability.

BEST MODE FOR CARRYING OUT THE INVENTION

A description will be made of an in-wheel motor drive unit 21 according to one embodiment of the present invention with reference to FIGS. 1 to 7.

Figure 6:
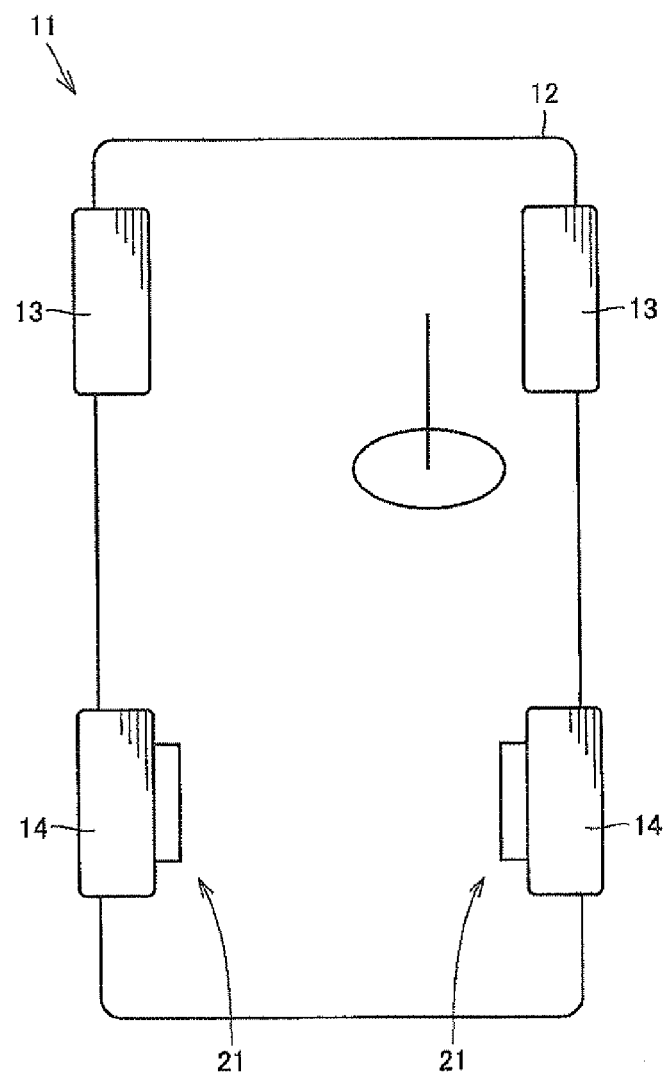
FIG. 6 is a plan view of an electric vehicle having the in-wheel motor drive unit in FIG. 1.
Figure 7:
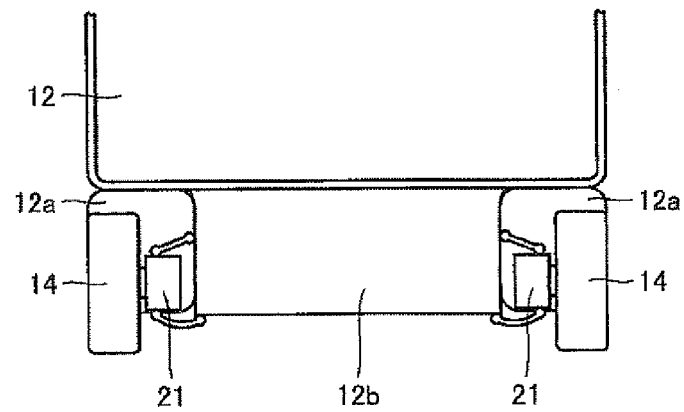
FIG. 7 is a cross-sectional view of the rear side of the electric vehicle in FIG. 6.
Figure 8:
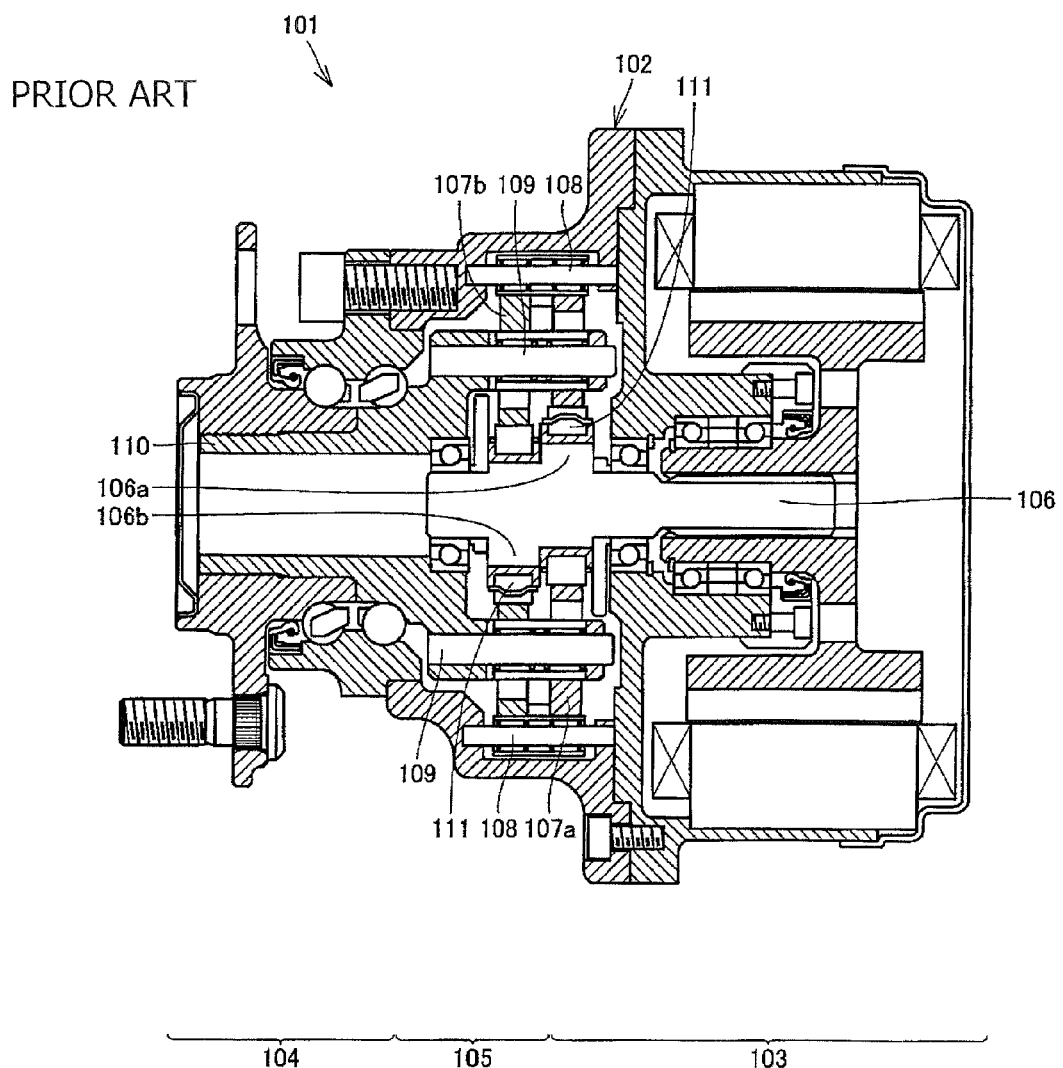
FIG. 8 is a view showing a conventional in-wheel motor drive unit.

FIG. 6 is a schematic view showing an electric vehicle 11 employing the in-wheel motor drive unit 21 according to the one embodiment of the present invention, and FIG. 7 is a schematic view showing the electric vehicle 11 taken from behind the vehicle. Referring to FIG. 6, the electric vehicle 11 includes a chassis 12, front wheels 13 serving as steering wheels, rear wheels 14 serving as drive wheels, and the in-wheel motor drive units 21 to transmit driving force to the right and left rear wheels 14. Referring to FIG. 7, the rear wheel 14 is housed in a wheel housing 12a of the chassis 12, and fixed to a lower part of the chassis 12 through a suspension device (suspension) 12b.

The suspension device 12b supports the rear wheels 14 by suspension arms extending in right and left directions, and prevents the chassis 12 from vibrating by absorbing vibration of the rear wheel 14 from the ground, with a strut including a coil spring and a shock absorber. Furthermore, a stabilizer to prevent a car body from inclining at the time of curving is provided at each connection portion of the right and left suspension arms. In addition, the suspension device 12b is desirably an independent suspension system capable of moving up and down the right and left wheels independently, in order to improve capability to follow irregularities of a road surface, and to transmit the driving force of the drive wheel to the road surface efficiently.

Since the electric vehicle 11 has the in-wheel motor drive units 21 to drive the right and left rear wheels 14, respectively inside the wheel housings 12a, it is not necessary to provide a motor, a drive shaft, and a differential gear mechanism on the chassis 12, so that the electric vehicle 11 has advantages of ensuring a large passenger space and controlling the rotations of the right and left drive wheels, respectively.

Meanwhile, in order to improve running stability of the electric vehicle 11, it is necessary to suppress an unspring weight. In addition, in order to ensure a larger passenger space, the in-wheel motor drive unit 21 is required to be miniaturized. Thus, the in-wheel motor drive unit 21 according to the one embodiment of the present invention is employed as shown in FIG. 1.

Figure 2:
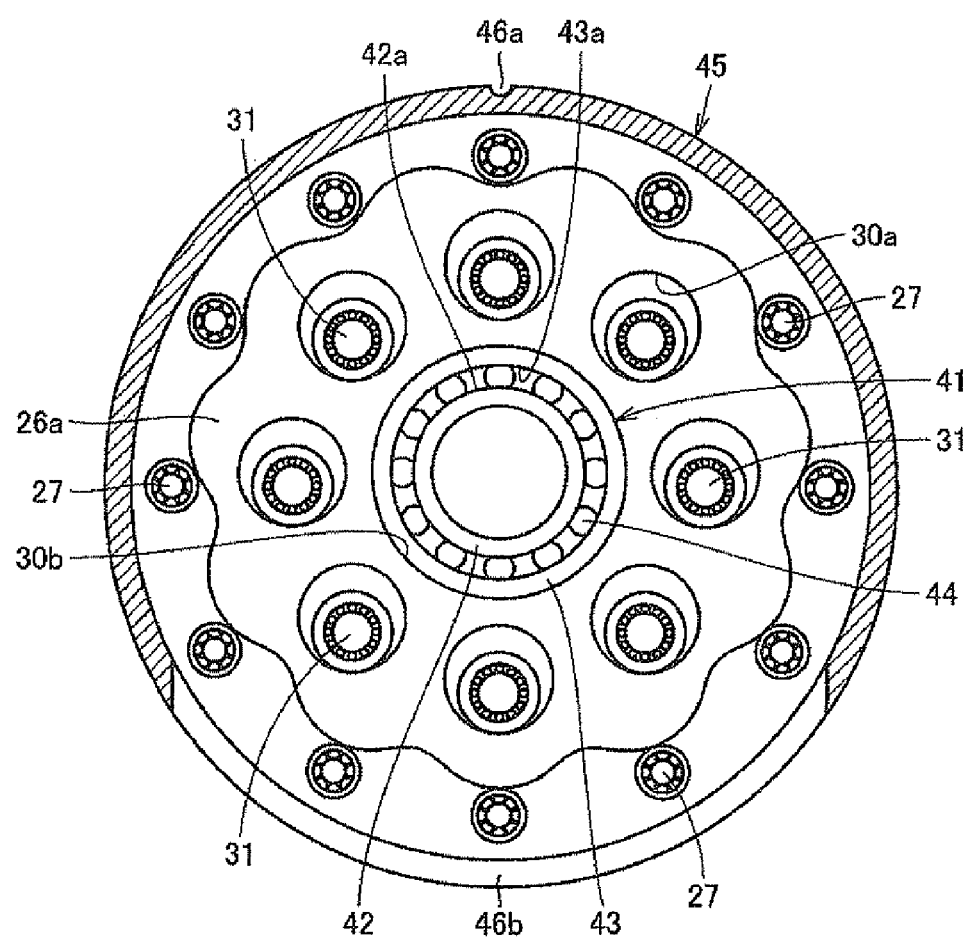
FIG. 2 is a cross-sectional view taken along a line II-II in FIG. 1.
Figure 3:
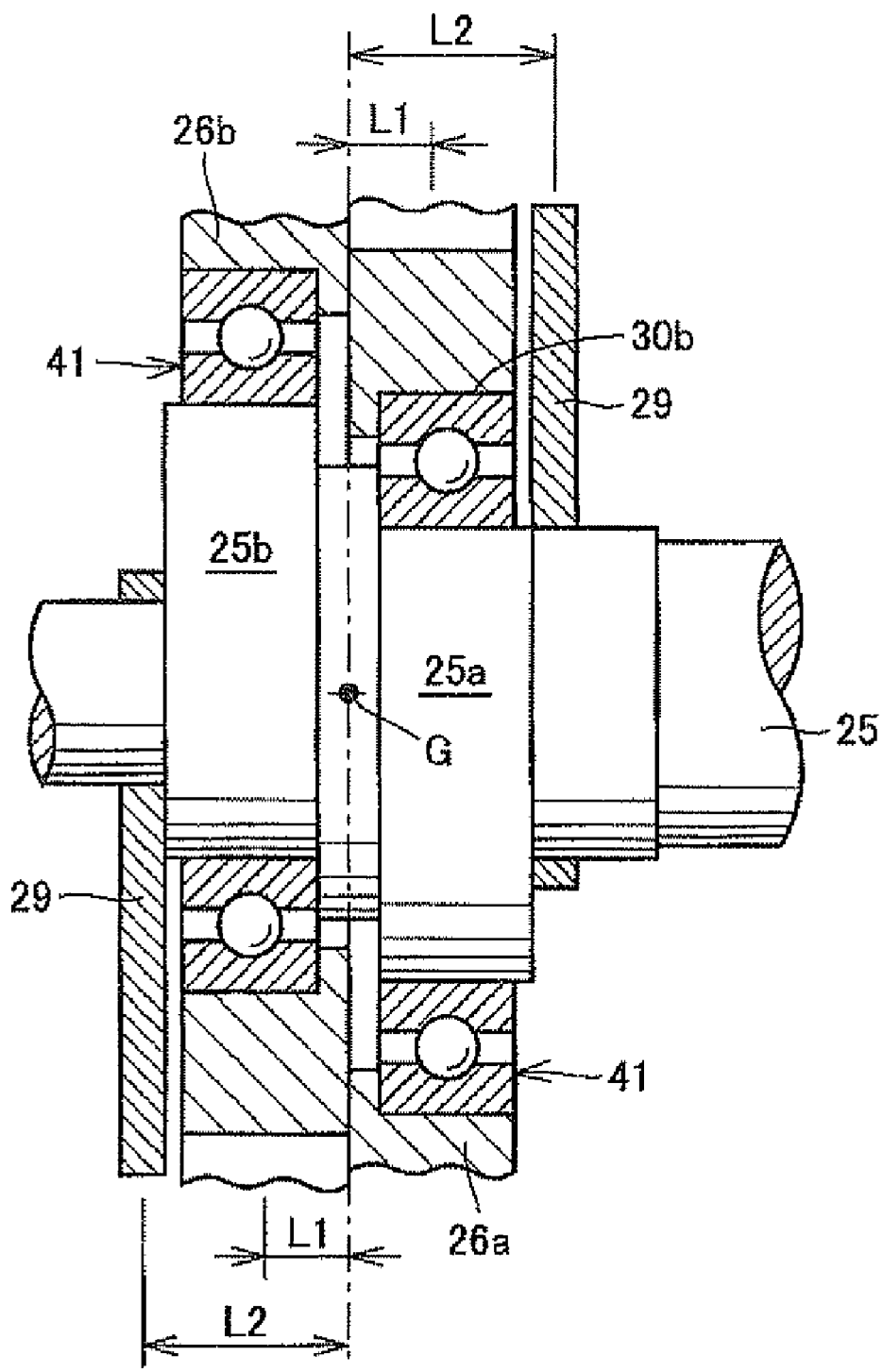
FIG. 3 is an enlarged view of a peripheral part of eccentric portions in FIG. 1.
Figure 4:
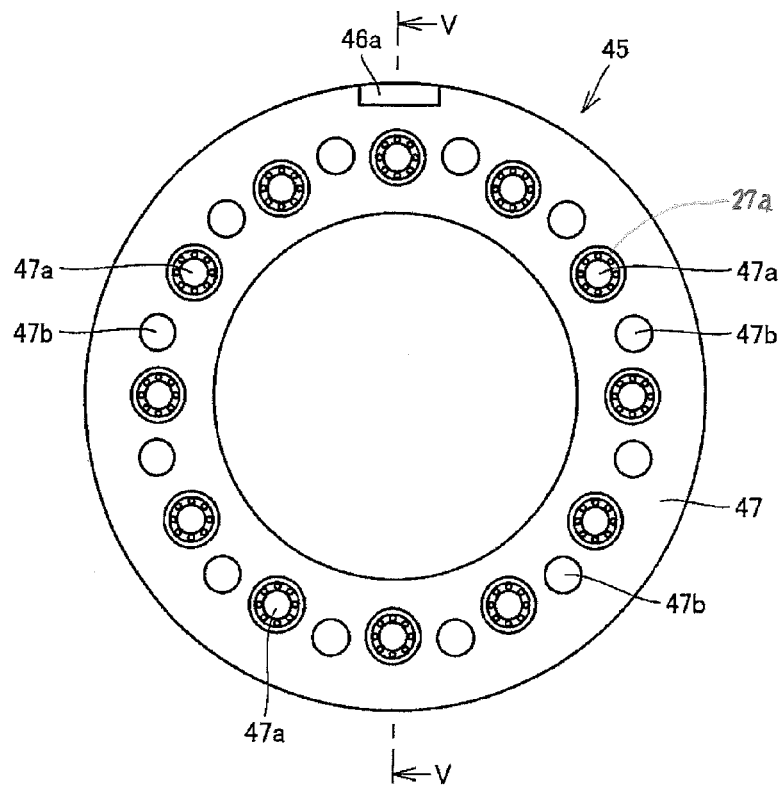
FIG. 4 is a view showing an outer pin holding portion in FIG. 1 taken from an axial direction.
Figure 5:
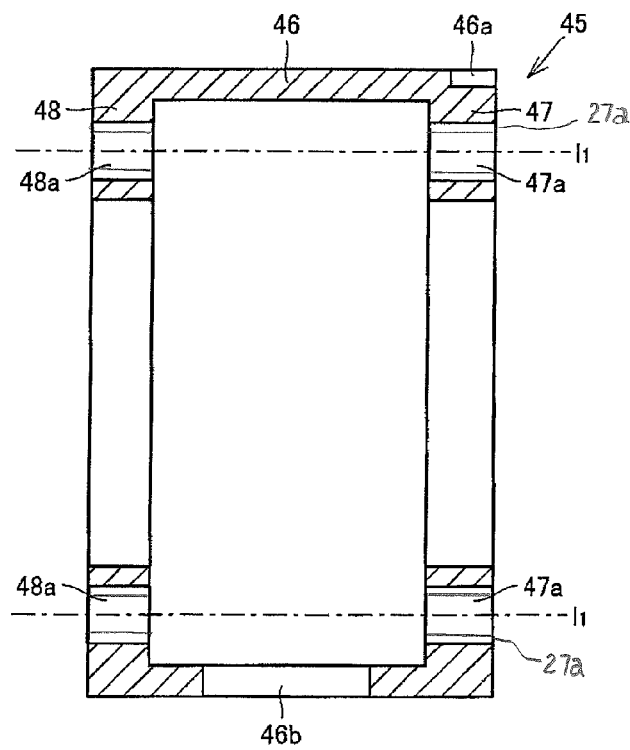
FIG. 5 is a cross-sectional view taken along a line V-V in FIG. 4.

A description will be made of the in-wheel motor drive unit 21 according to the one embodiment of the present invention with reference to FIGS. 1 to 5. In addition, FIG. 1 is a schematic cross-sectional view of the in-wheel motor drive unit 21, FIG. 2 is a cross-sectional view taken along a line II-II in FIG. 1, FIG. 3 is an enlarged view of a peripheral part of eccentric portions 25a and 25b, FIG. 4 is a view of an outer pin holding portion 45 taken in an axial direction, and FIG. 5 is a cross-sectional view taken along a line V-V in FIG. 4.

Figure 1:
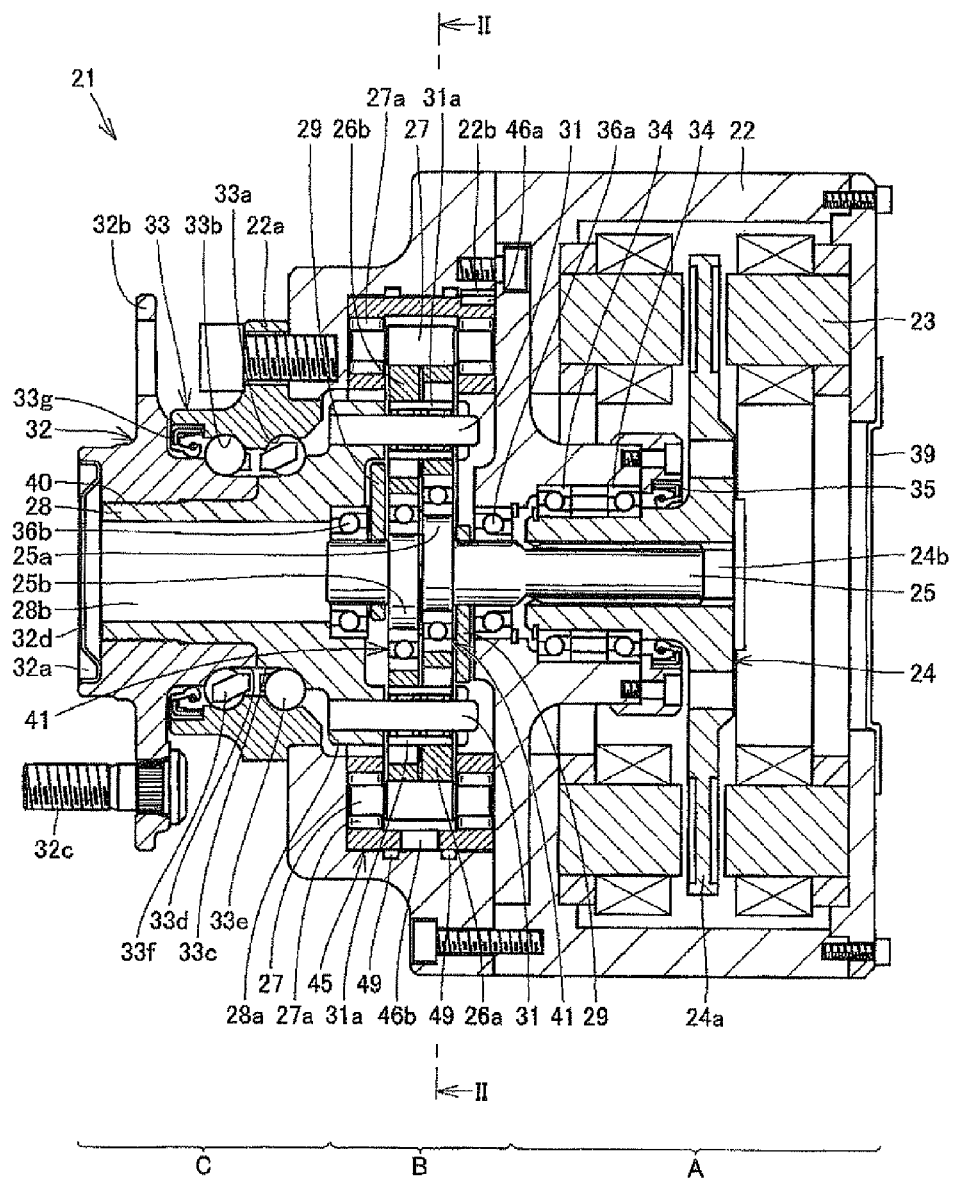
FIG. 1 is a view showing an in-wheel motor drive unit according to one embodiment of the present invention.

First, referring to FIG. 1, the in-wheel motor drive unit 21 as one example of a vehicle speed reduction portion includes a motor portion A to generate driving force, a speed reduction portion B to reduce the rotation speed of the motor portion A and output it, and a wheel hub bearing portion C to transmit the output from the speed reduction portion B to the drive wheel 14, and the motor portion A and the speed reduction portion B are housed in a casing 22 and mounted on the wheel housing 12a of the electric vehicle 11 as shown in FIG. 7.

The motor portion A is an axial gap motor having a stator 23 fixed to the casing 22, a rotor 24 arranged on the inner side of the stator 23 so as to be opposed thereto with an axial interval in between, and a motor side rotation member 25 fixedly connected on the inner side of the rotor 24 and integrally rotating with the rotor 24. In addition, a sealing member 39 is provided on an end face of the motor portion A on the opposite side of the speed reduction portion B in order to prevent dust from entering the motor portion A.

The rotor 24 has a flange-shaped rotor portion 24a and a cylindrical hollow portion 24b, and it is rotatably supported by a rolling bearing 34 so as to be rotatable with respect to the casing 22. In addition, a sealing member 35 is provided between the casing 22 and the rotor 24 in order to prevent a lubricant agent sealed in the speed reduction portion B from entering the motor portion A.

The motor side rotation member 25 extends from the motor portion A to the speed reduction portion B in order to transmit the driving force of the motor portion A to the speed reduction portion B, and has the eccentric portions 25a and 25b in the speed reduction portion B. This motor side rotation member 25 has one end fitted in the rotor 24, and it is supported by rolling bearings 36a and 36b at both ends of the speed reduction portion B. Furthermore, the two eccentric portions 25a and 25b are provided such that their phases are shifted by 180° in order to offset the vibrations generated by centrifugal force due to eccentric motion to each other.

The speed reduction portion B includes curve plates 26a and 26b serving as revolution members rotatably held by the eccentric portions 25a and 25b, a plurality of outer pins 27 serving as circumference engagement members which engage with circumference portions of the curve plates 26a and 26b, a motion conversion mechanism to transmit the rotation motion of the curve plates 26a and 26b to a wheel side rotation member 28, and counter weights 29 arranged adjacent to the eccentric portions 25a and 25b.

The wheel side rotation member 28 has a flange portion 28a and a shaft portion 28b. Holes to fix inner pins 31 are formed in the end face of the flange portion 28a at regular intervals along the circumference of a circle around the rotation axis of the wheel side rotation member 28. The shaft portion 28b has a hollow structure and around its outer diameter surface, a first inner track surface 33c of a wheel hub bearing 33 is formed.

Referring to FIGS. 2 and 3, the curve plate 26a has a plurality of waveforms formed by a trochoid line such as an epitrochoid line along its circumference, and has a plurality of through holes 30a and 30b penetrating from one side end face to the other side end face. The plurality of through holes 30a are provided at regular intervals along the circumference of the circle around the rotation axis of the curve plate 26a and receives the inner pins 31 which will be described below. In addition, the through hole 30b is provided in the center of the curve plate 26a and fits the eccentric portion 25a.

The curve plate 26a is supported by a rolling bearing 41 so as to be rotatable with respect to the eccentric portion 25a. Referring to FIG. 3, the rolling bearing 41 is a deep groove ball bearing including an inner ring member 42 which fits an outer diameter surface of the eccentric portion 25a and has an inner track surface 42a around the outer diameter surface thereof, an outer ring member 43 which fits an inner diameter surface of the through hole 30b of the curve plates 26a and has an outer track surface 43a around the inner diameter surface thereof, a plurality of balls 44 arranged between the inner track surface 42a and the outer track surface 43a, and a retainer (not shown) to retain the interval of the adjacent balls 44.

The outer pins 27 are provided at regular intervals along a circumferential track of the circle around the rotation axis of the motor side rotation member 25. Thus, when the curve plates 26a and 26b make revolution movements, the curved waveforms engage with the outer pins 27, so that the curve plates 26a and 26b make rotation movements.

In addition, the outer pins 27 are not directly held by the casing 22, but held by the outer pin holding portion 45 fixedly fitted in the inner diameter surface of the casing 22. More specifically, it is rotatably supported by a needle roller bearing 27a whose axial both ends are fixed to the outer pin holding portion 45. Thus, since the outer pins 27 are rotatably held by the outer pin holding portion 45, contact resistance generated due to the engagement with the curve plates 26a and 27b can be reduced.

Figure 9:
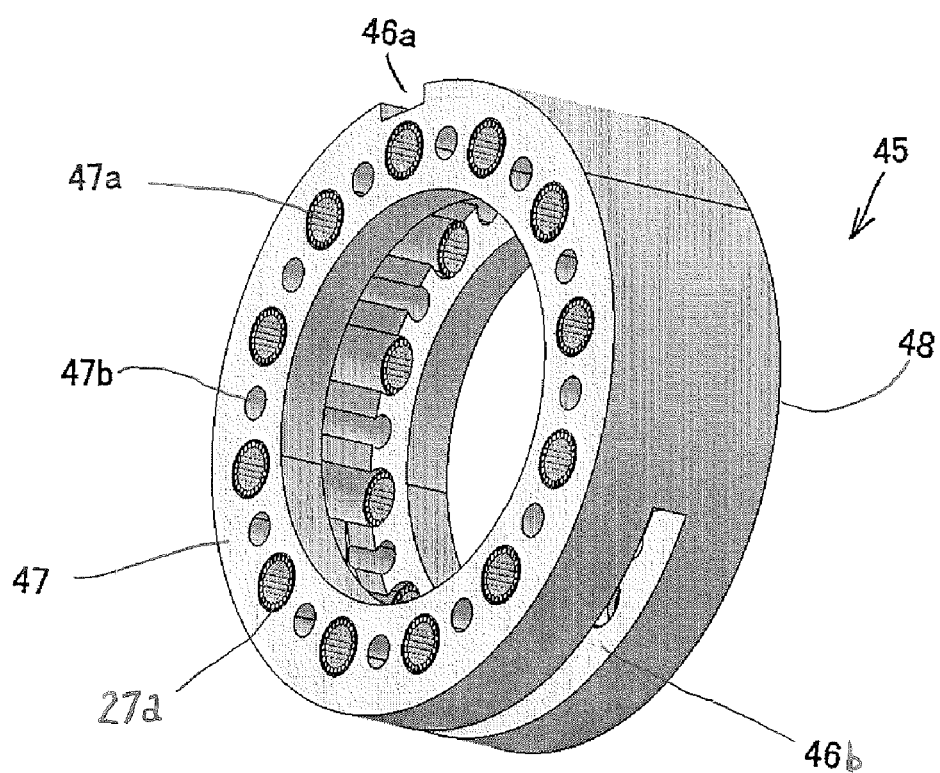
FIG. 9 is a perspective view of the outer pin holding portion shown in FIG. 4.

Referring to FIGS. 4, 5, and 9, the outer pin holding portion 45 includes a cylindrical portion 46, and a pair of ring portions 47 and 48 extending from axial both ends of the cylindrical portion 46 to the radially inner side. The outer pin holding portion 45 is fixedly fitted in the inner diameter surface of the casing 22 through an elastic member 49. This elastic member 49 allows the displacement of the outer pin holding portion 45 in the axial direction. Thus, even when a large radial load and moment load are applied due to the turn and abrupt acceleration and reduction in speed of the electric vehicle 11, the components such as the curve plates 26a and 26b, the outer pin 27, and the inner pin 31 can be prevented from being damaged. In addition, sound is prevented from generating between the casing 22 and the outer pin holding portion 45 due to the vibration at the time of traveling a rough road.

The cylindrical portion 46 has a key groove 46a provided in an outer diameter surface. In addition, as shown in FIG. 1, a key groove 22b is also provided in the casing, at a position opposed to the key groove 46a. These key grooves 22b and 46a function as a rotation stopper portion to prevent the outer pin holding portion 45 from relatively rotating with respect to the casing 22. More specifically, when a key (not shown) is provided astride the key grooves 22b and 46a, the outer pin holding portion 45 can be prevented from relatively rotating with respect to the casing 22.

In addition, the structure of the rotation stopper portion is not limited to the above, and any structure may be employed as long as the relative rotation between the outer pin holding portion 45 and the casing 22 can be prevented. For example, one of the outer diameter surface of the outer pin holding portion 45 and the inner diameter surface of the casing may have a projection portion projecting toward the other and the other may have a recession portion to receive the projection portion.

In addition, a curve plate insertion hole 46b penetrating in the radial direction is formed at least one position on the circumference of the cylindrical portion 46 so that the curve plates 26a and 26b can be inserted. Thus, the curve plates 26a and 26b can be incorporated in a radial direction of the outer pin holding portion 45.

The ring portions 47 and 48 have through holes 47a and 48a penetrating in a thickness direction, and recession portions 47b and 48b, respectively. Each of the through holes 47a and 48a extends in a direction parallel to the rotation axis of the motor side rotation member 25. In addition, the corresponding through holes 47a and 48a are provided so as to be opposed to each other. That is, center axis lines $l_1$ of the through holes 47a and 48a coincide with each other. In addition, after the outer pin holding portion 45 is mounted on the casing 22, the center axis lines $l_1$ are parallel to the rotation axis of the motor side rotation member 25.

Thus, the outer pins 27 can be held parallel to the rotation axis of the motor side rotation member 25. In addition, since the through holes 47a and 48a can be formed by the same process at the same time, the center axis lines $l_1$ can be comparatively easy to coincide with each other.

Meanwhile, the recession portion 47b is provided in order to reduce the outer pin holding portion 45 in weight, and may be a through hole or a non-penetrating recession portion. In addition, its shape may be another shape such as a rectangular shape instead of the circular shape. In addition, in order to reduce the in-wheel motor drive unit 21 in weight, the casing 22 is made of light metal such as an aluminum alloy and a magnesium alloy. Meanwhile, the outer pin holding portion 45 required to be high in strength is desirably made of carbon steel.

The counter weights 29 is in the form of a disk shape, and has a through hole which is provided at the position apart from its center and fits the motor side rotation member 25, and arranged at the position adjacent to each of the eccentric portions 25a and 25b such that a phase is shifted by 180° from that of the eccentric portion in order to negate disproportional inertia couple generated due to the rotations of the curve plates.

Here, referring to FIG. 3, when it is assumed that reference G represents the center point between the two curve plates 26a and 26b, regarding the left side of the center point G in FIG. 3, a relationship $L_1 \times m_1 \times \epsilon_1 = L_2 \times m_2 \times \epsilon_2$ is satisfied wherein $L_1$ represents a distance between the center point G and the center of the curve plate 26a, $m_1$ represents a sum of weights of the curve plate 26a, the rolling bearing 41, and the eccentric portion 25a, and $\epsilon_1$ represents an eccentric amount of the gravity center of the curve plate 26a from the rotation axis, $L_2$ represents a distance between the center point G and the counter weight 29, $m_2$ represents a weight of the counter weight 29, and $\epsilon_2$ represents an eccentric amount of the gravity center of the counter weight 29 from the rotation axis. In addition, regarding the left side of the center point G in FIG. 3, the similar relationship can be established between the curve plate 26b and the counter weight 29.

The motion conversion mechanism is composed of the plurality of inner pins 31 held by the wheel side rotation member 28, and the through holes 30a provided in the curve plates 26a and 26b. The inner pins 31 are provided at regular intervals along the circumferential track around the rotation axis of the wheel side rotation member 28, and their axial one side ends are fixed to the wheel side rotation member 28. In addition, in order to reduce the friction resistance with the curve plates 26a and 26b, a needle roller bearing 31a is provided so as to abut on inner wall surface of the through hole 30a of each of the curve plates 26a and 26b. Meanwhile, the through hole 30a is provided at a position corresponding to each of the plurality of inner pins 31, and an inner diameter dimension of the through hole 30a is set to be larger than an outer diameter dimension (which means a "maximum outer diameter involving the needle roller bearing 31a", and the same is applied hereinafter) of the inner pin 31 by a certain amount.

The wheel hub bearing portion C includes a wheel hub 32 fixedly connected to the wheel side rotation member 28, and the wheel hub bearing 33 rotatably retaining the wheel hub 32 with respect to the casing 22. The wheel hub 32 has a cylindrical hollow portion 32a and a flange portion 32b. The flange portion 32b is fixedly connected to the drive wheel 14 by a bolt 32c. In addition, an opening portion of the hollow portion 32a is covered with a sealing member 32d in order to prevent dust from entering the in-wheel motor drive unit 21.

The wheel hub bearing 33 is a double row angular ball bearing having balls 33e as rolling bodies. The track surfaces of the balls 33e include a first outer track surface 33a (right side in the drawing) and a second outer track surface 33b (left side in the drawing) provided on an inner diameter surface of an outer member 22a. The first inner track surface 33c opposed to the first outer track surface 33a is provided on the outer diameter surface of the wheel side rotation member 28, and a second inner track surface 33d opposed to the second outer track surface 33b is provided on the outer diameter surface of the wheel hub 32. Thus, the plurality of balls 33e are arranged between the first outer track surface 33a and the first inner track surface 33c, and between the second outer track surface 33b and the second inner track surface 33d. In addition, the wheel hub bearing 33 includes a retainer 33f to retain the balls 33e in each of the right and left rows, and a sealing member 33g to prevent a lubricant agent such as grease sealed in the bearing from leaking, and dust from entering it from the outside.

The wheel hub 32 and the wheel side rotation member 28 are fixed by expansion fit. The "expansion fit" means that the wheel side rotation member 28 and the wheel hub 32 are plastically connected at a plastic connection portion 40 by press-fitting a press-fit tool (not shown) having an outer diameter a little larger than an inner diameter of the shaft portion 28b of the wheel side rotation member 28 into an inner diameter portion of the shaft portion 28b, under the condition that the in-wheel motor drive unit 21 is fixed. When the wheel side rotation member 28 and the wheel hub 32 are fixedly connected by the above method, their connection strength can be considerably enhanced as compared with the case where they are fixed by usual fit. Thus, the wheel hub 32 can be stably retained.

A detailed description will be made of an operation principle of the above in-wheel motor drive unit 21.

For example, when the motor portion A receives electromagnetic force generated by supplying an AC current to a coil of the stator 23, the rotor 24 composed of a permanent magnet or a magnetic body rotates. At this time, as the frequency of the voltage applied to the coil increases, the rotation speed of the rotor 24 increases.

Thus, when the motor side rotation member 25 connected to the rotor 24 rotates, the curve plates 26a and 26b make revolution movements around the rotation axis of the motor side rotation member 25. At this time, the outer pins 27 engage with the curve-shaped waveforms of the curve plates 26a and 26b and the curve plates 26a and 26b make rotation movements in a direction opposite to the rotation of the motor side rotation member 25.

The inner pins 31 in the through holes 30a abut on the inner wall surfaces of the through holes 30a while the curve plates 26a and 26b make the rotation movement. Thus, the revolution movements of the curve plates 26a and 26b are not transmitted to the inner pins 31, and only the rotation movements of the curve plates 26a and 26b are transmitted to the wheel hub bearing portion C through the wheel side rotation member 28.

At this time, since the rotation of the motor side rotation member 25 is reduced in speed by the speed reduction portion B and transmitted to the wheel side rotation member 28, torque required for the drive wheel 14 can be transmitted even when the motor portion A is a low-torque and high-rotation type.

In addition, a reduction ratio of the above speed reduction portion B is calculated by a formula $(Z_A-Z_B)/Z_B$ wherein $Z_A$ represents the number of the outer pins 27 and $Z_B$ represents the number of the waveforms of the curve plates 26a and 26b. According to the embodiment shown in FIG. 2, since $Z_A=12$ and $Z_B=11$, the reduction ratio is 1/11, which is a considerably large ratio.

Thus, by employing the speed reduction portion B which can get high reduction ratio without having a multistage configuration, the in-wheel motor drive unit 21 can be compact and get a high reduction ratio. In addition, since the outer pins 27 are rotatable with respect to the holding portion 45, and the needle roller bearings 31a are provided at positions in which the inner pins 31 abut on the curve plates 26a and 26b, the friction resistance is reduced, so that the transmission efficiency of the speed reduction portion B can be improved.

When the in-wheel motor drive unit 21 according to the above embodiment is employed in the electric vehicle 11, the unspring weight can be suppressed. As a result, the electric vehicle 11 can be superior in running stability.

In addition, while the two curve plates 26a and 26b are provided in the speed reduction portion B such that their phases are shifted by 180° in the above embodiment, the number of the curve plates can be set optionally, and when three curve plates are provided, for example, their phases are shifted by 120°.

In addition, while the motion conversion mechanism in the above embodiment is composed of the inner pins 31 fixed to the wheel side rotation member 28, and the through holes 30a provided in the curve plates 26a and 26b, the present invention is not limited to this and any configuration can be used as long as the rotation of the speed reduction portion B can be transmitted to the wheel hub 32. For example, the motion conversion mechanism may be composed of an inner pin fixed to the curve plate, and a hole formed in the wheel side rotation member.

In addition, while the description of the operation in the above embodiment has been made focusing on the rotation of each member, in fact the motive power involving torque is transmitted from the motor portion A to the drive wheel. Therefore, the motive power reduced as described above is converted to high torque.

In addition, while the electric power is supplied to the motor portion A to drive the motor portion A, and the motive power is transmitted from the motor portion A to the drive wheel 14 in the description of the operation in the above embodiment, when the vehicle is reduced in speed or goes downhill to the contrary, the motive power from the drive wheel 14 is converted to high-speed and low-torque rotation in the speed reduction portion B and transmitted to the motor portion A, and an electric power may be generated in the motor portion A. Thus, the electric power generated here may be stored in a battery and used to drive the motor portion A later, or to operate another electrically-powered equipment provided in the vehicle.

Moreover, a brake may be added to the configuration of the above embodiment. For example, a parking brake may be added to the configuration in FIG. 1 such that the casing 22 is elongated in the axial direction to form a space on the right side of the rotor 24 in the drawing, and a rotation member integrally rotating with the rotor 24, a piston incapable of rotating but capable of moving in the axial direction, and a cylinder to operate the piston are arranged in the casing 22, and when the vehicle is stopped, the piston and the rotation member are fitted to lock the rotor 24.

Alternatively, a disk brake may be added such that a flange provided at a part of a rotation member integrally rotating with the rotor 24 and a friction plate set on the side of the casing 22 are sandwiched by cylinders set on the side of the casing 22. Further alternatively, a drum brake can be used such that a drum is formed at a part of the rotation member, a brake shoe is fixed on the side of the casing 22 to lock the rotation member by friction engaging and self engaging actions.

In addition, while the deep groove ball bearing is used as the bearing to support the curve plates 26a and 26b in the above embodiment, the bearing can be any kind, such as a sliding bearing, cylindrical roller bearing, tapered roller bearing, needle roller bearing, self-aligning roller bearing, angular ball bearing, and four-point contact ball bearing regardless of whether the bearing is the sliding bearing or the roller bearing, whether the rolling body is the roller or the ball, and whether the bearing has double rows or single row. In addition, the bearing arranged at another position may be any kind similarly.

In addition, while the axial gap motor is used in the motor portion A in the above each embodiment, any kind of motor can be used therein. For example, the motor portion A may be a radial gap motor including a stator fixed to the casing, and a rotor arranged inside the stator so as to be opposed thereto with a radial gap in between.

Furthermore, while the electric vehicle 11 shown in FIG. 6 has the rear wheels 14 serving as the drive wheels, the present invention is not limited to this and the front wheel 13 may be the drive wheel, or a four-wheel-drive car may be employed. In addition, the "electric vehicle" in this specification means any vehicle driven by an electric power and it is to be noted that it includes a hybrid car and the like.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

Industrial Applicability

The present invention is advantageously applied to an in-wheel motor drive unit.

The invention claimed is:

1. An in-wheel motor drive unit comprising:
a motor portion to rotate and drive a motor side rotation member having an eccentric portion;
a speed reduction portion to reduce rotation speed of said motor side rotation member and transmit the rotation of said motor side rotation member to a wheel side rotation member;
a casing to hold said motor portion and said speed reduction portion; and
a wheel hub fixedly connected to said wheel side rotation member, wherein
said speed reduction portion includes:
a revolution member having a through hole for the insertion of said eccentric portion to make a revolution movement around a rotation axis of said motor side rotation member in conjunction with a rotation thereof,
a circumference engagement member to engage with a circumference of said revolution member to generate a rotation movement of said revolution member;
a circumference engagement member holding portion fixedly fitted in an inner diameter surface of said casing holding the speed reduction portion, to hold said circumference engagement member parallel to the rotation axis of said motor side rotation member; and
a motion conversion mechanism to convert the rotation movement of said revolution member to the rotation movement moving around the rotation axis of said motor side rotation member and transmit the rotation movement to said wheel side rotation member, and
said circumference engagement member holding portion includes:
a cylindrical portion;
a pair of ring portions extending from axial both ends of said cylindrical portion to the radial inner side; and
a pair of circumference engagement member holding holes provided at opposed positions of the pair of ring portions, and extending parallel to the rotation axis of said motor side rotation member to hold axial ends of said circumference engagement member;
wherein said cylindrical portion has a revolution member insertion hole penetrating in a radial direction such that said revolution member can be inserted in the radial direction.

2. The in-wheel motor drive unit according to claim 1, wherein
said pair of ring portions has a recession portion to reduce its thickness.

3. The in-wheel motor drive unit according to claim 1, wherein
a rotation stopper portion is provided at positions opposed to an inner diameter surface of said casing and to an outer diameter surface of said circumference engagement member holding portion to prevent said circumference engagement member holding portion from relatively rotating with respect to said casing.

4. The in-wheel motor drive unit according to claim 1, wherein
an elastic member to allow displacement of said circumference engagement member holding portion in the radial direction is arranged between said circumference engagement member holding portion and said casing.

5. The in-wheel motor drive unit according to claim 1, wherein
said casing is made of light metal, and
said circumference engagement member holding portion is made of carbon steel.

* * * * *